United States Patent
Braaksma et al.

(10) Patent No.: US 9,874,648 B2
(45) Date of Patent: Jan. 23, 2018

(54) RESERVOIR CONNECTIVITY ANALYSIS IN A 3D EARTH MODEL

(75) Inventors: Hendrik Braaksma, Spring, TX (US); Yao-Chou Cheng, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 922 days.

(21) Appl. No.: 13/976,364

(22) PCT Filed: Nov. 2, 2011

(86) PCT No.: PCT/US2011/058977
§ 371 (c)(1),
(2), (4) Date: Jun. 26, 2013

(87) PCT Pub. No.: WO2012/115689
PCT Pub. Date: Aug. 30, 2012

(65) Prior Publication Data
US 2013/0338984 A1 Dec. 19, 2013

Related U.S. Application Data

(60) Provisional application No. 61/444,921, filed on Feb. 21, 2011.

(51) Int. Cl.
*G01V 1/34* (2006.01)
*G01V 11/00* (2006.01)
(Continued)

(52) U.S. Cl.
CPC .............. *G01V 1/345* (2013.01); *G01V 11/00* (2013.01); *G01V 99/005* (2013.01);
(Continued)

(58) Field of Classification Search
CPC .. G01V 1/345; G01V 11/00; G01V 2210/644; G01V 2210/641; G01V 99/005; G06F 2217/16; G06F 17/5009
See application file for complete search history.

(56) References Cited

U.S. PATENT DOCUMENTS

| | | |
|---|---|---|
| 5,468,088 A | 11/1995 | Shoemaker et al. |
| 5,708,764 A | 1/1998 | Borrel et al. |
| (Continued) | | |

FOREIGN PATENT DOCUMENTS

| | | |
|---|---|---|
| EP | 1230566 | 2/2002 |
| EP | 1036341 | 2/2016 |
| (Continued) | | |

OTHER PUBLICATIONS

La Pointe, P. R., & Wallmann, P. C. (Jan. 1, 1996). Three-dimensional Flow Analysis In Complex Fracture Networks Through Graph Theory-based Search Algorithms. American Rock Mechanics Association.*

(Continued)

*Primary Examiner* — Kamini S Shah
*Assistant Examiner* — Steven W Crabb
(74) *Attorney, Agent, or Firm* — ExxonMobil Upstream Research Company—Law Department

(57) ABSTRACT

There is provided a system and method for reservoir connectivity analysis in a 3D earth model. A subsurface region is identified and a baseline reservoir connectivity model is obtained from the subsurface region. Compartments and connections are determined from the baseline reservoir connectivity model using reservoir connectivity analysis, and a set of 3D objects representing the compartments and/or connections is created from the 3D earth model. A mathematical graph structure is created from the 3D objects and reservoir connectivity scenarios are evaluated based on analysis of the mathematical graph structure and 3D objects.

25 Claims, 12 Drawing Sheets

(51) Int. Cl.
*G06F 17/50* (2006.01)
*G01V 99/00* (2009.01)

(52) U.S. Cl.
CPC .. *G01V 2210/641* (2013.01); *G01V 2210/644* (2013.01); *G06F 17/5009* (2013.01); *G06F 2217/16* (2013.01)

(56) References Cited

U.S. PATENT DOCUMENTS

| | | |
|---|---|---|
| 5,992,519 A | 11/1999 | Ramakrishman et al. |
| 6,035,255 A | 3/2000 | Murphy et al. |
| 6,044,328 A | 3/2000 | Murphy et al. |
| 6,070,125 A | 5/2000 | Murphy et al. |
| 6,219,061 B1 | 4/2001 | Lauer et al. |
| 6,236,994 B1 | 5/2001 | Swartz et al. |
| 6,353,677 B1 | 3/2002 | Pfister et al. |
| 6,373,489 B1 | 4/2002 | Lu et al. |
| 6,490,528 B2 | 12/2002 | Cheng et al. |
| 6,516,274 B2 | 2/2003 | Cheng et al. |
| 6,519,568 B1 | 2/2003 | Harvey et al. |
| 6,549,879 B1 | 4/2003 | Cullick et al. |
| 6,643,656 B2 | 11/2003 | Peterson |
| 6,757,613 B2 | 6/2004 | Chapman et al. |
| 6,765,570 B1 | 7/2004 | Cheung et al. |
| 6,766,254 B1 | 7/2004 | Bradford et al. |
| 6,772,066 B2 | 8/2004 | Cook |
| 6,823,266 B2 | 11/2004 | Czemuszenko et al. |
| 6,823,732 B2 | 11/2004 | Corghi |
| 6,826,483 B1 | 11/2004 | Anderson et al. |
| 6,829,570 B1 | 12/2004 | Thambynayagam et al. |
| 6,912,467 B2 | 6/2005 | Schuette |
| 6,912,468 B2 | 6/2005 | Marin et al. |
| 6,980,939 B2 | 12/2005 | Dhir et al. |
| 6,980,940 B1 | 12/2005 | Gurpinar et al. |
| 6,993,434 B2 | 1/2006 | Cheng et al. |
| 7,003,439 B2 | 2/2006 | Aldred et al. |
| 7,027,925 B2 | 4/2006 | Terentyev et al. |
| 7,031,842 B1 | 4/2006 | Musat et al. |
| 7,050,953 B2 | 5/2006 | Chiang et al. |
| 7,069,149 B2 | 6/2006 | Goff et al. |
| 7,079,953 B2 | 7/2006 | Thorne et al. |
| 7,096,172 B2 | 8/2006 | Colvin et al. |
| 7,098,908 B2 | 8/2006 | Acosta et al. |
| 7,136,064 B2 | 11/2006 | Zuiderveld |
| 7,181,380 B2 | 2/2007 | Dusterhoft et al. |
| 7,203,342 B2 | 4/2007 | Pedersen |
| 7,248,258 B2 | 7/2007 | Acosta et al. |
| 7,280,932 B2 | 10/2007 | Zoraster et al. |
| 7,281,213 B2 | 10/2007 | Callegari |
| 7,283,941 B2 | 10/2007 | Horowitz et al. |
| 7,298,376 B2 | 11/2007 | Chuter |
| 7,314,588 B2 | 1/2008 | Blankenship |
| 7,330,791 B2 | 2/2008 | Kim et al. |
| 7,337,067 B2 | 2/2008 | Sanstrom |
| 7,362,329 B2 | 4/2008 | Zuiderveld |
| 7,363,866 B2 | 4/2008 | Gnedenko et al. |
| 7,366,616 B2 | 4/2008 | Bennett et al. |
| 7,395,252 B2 | 7/2008 | Anderson et al. |
| 7,409,438 B2 | 8/2008 | McConnell et al. |
| 7,412,363 B2 | 8/2008 | Callegari |
| 7,437,358 B2 | 10/2008 | Arrouye et al. |
| 7,451,066 B2 | 11/2008 | Edwards et al. |
| 7,458,062 B2 | 11/2008 | Coulthard et al. |
| 7,460,957 B2 | 12/2008 | Prange et al. |
| 7,478,024 B2 | 1/2009 | Gurpinar et al. |
| 7,512,543 B2 | 3/2009 | Raghuraman et al. |
| 7,519,976 B2 | 4/2009 | Blevins |
| 7,539,625 B2 | 5/2009 | Klumpen et al. |
| 7,548,873 B2 | 6/2009 | Veeningen et al. |
| 7,565,243 B2 | 7/2009 | Kim et al. |
| 7,576,740 B2 | 8/2009 | Dicken |
| 7,584,086 B2 | 9/2009 | Frankel |
| 7,596,481 B2 | 9/2009 | Zamora et al. |
| 7,603,264 B2 | 10/2009 | Zamora et al. |
| 7,606,666 B2 | 10/2009 | Repin et al. |
| 7,616,213 B2 | 11/2009 | Chuter |
| 7,620,534 B2 | 11/2009 | Pita et al. |
| 7,627,430 B2 | 12/2009 | Hawtin |
| 7,630,914 B2 | 12/2009 | Veeningen et al. |
| 7,652,779 B2 | 1/2010 | Wu et al. |
| 7,657,407 B2 | 2/2010 | Logan |
| 7,657,414 B2 | 2/2010 | Zamora et al. |
| 7,668,700 B2 | 2/2010 | Erignac et al. |
| 7,684,929 B2 | 3/2010 | Prange et al. |
| 7,711,550 B1 | 5/2010 | Feinberg et al. |
| 7,716,028 B2 | 5/2010 | Montaron et al. |
| 7,725,302 B2 | 5/2010 | Ayan et al. |
| 7,739,089 B2 | 6/2010 | Gurpinar et al. |
| 7,743,006 B2 | 6/2010 | Woronow et al. |
| 7,796,468 B2 | 9/2010 | Kellogg |
| 7,814,989 B2 | 10/2010 | Nikolakis-Mouchas |
| 7,876,705 B2 | 1/2011 | Gurpinar et al. |
| 7,886,285 B2 | 2/2011 | Asselin et al. |
| 7,913,190 B2 | 3/2011 | Grimaud et al. |
| 7,925,483 B2 | 4/2011 | Xia et al. |
| 7,925,695 B2 | 4/2011 | McConnell et al. |
| 7,953,585 B2 | 5/2011 | Guipinar et al. |
| 7,953,587 B2 | 5/2011 | Bratton et al. |
| 7,970,545 B2 | 6/2011 | Sanstrom |
| 7,986,319 B2 | 7/2011 | Dommisse et al. |
| 7,991,600 B2 | 8/2011 | Callegari |
| 7,995,057 B2 | 8/2011 | Chuter |
| 8,005,658 B2 | 8/2011 | Tilke et al. |
| 8,044,602 B2 | 10/2011 | Smith |
| 8,055,026 B2 | 11/2011 | Pedersen |
| 8,064,684 B2 | 11/2011 | Ratti et al. |
| 8,073,664 B2 | 12/2011 | Schottle et al. |
| 8,094,515 B2 | 1/2012 | Miller et al. |
| 8,103,493 B2 | 1/2012 | Sagert et al. |
| 8,145,464 B2 | 3/2012 | Arnegaard et al. |
| 8,155,942 B2 | 4/2012 | Sarma et al. |
| 8,199,166 B2 | 6/2012 | Repin et al. |
| 8,204,728 B2 | 6/2012 | Schottle et al. |
| 8,249,844 B2 | 8/2012 | Dale et al. |
| 8,259,126 B2 | 9/2012 | Chuter |
| 8,280,635 B2 | 10/2012 | Ella et al. |
| 8,296,720 B2 | 10/2012 | Coulthard et al. |
| 8,301,426 B2 | 10/2012 | Abasov et al. |
| 8,325,179 B2 | 12/2012 | Murray et al. |
| 8,346,695 B2 | 1/2013 | Pepper et al. |
| 8,364,404 B2 | 1/2013 | Legendre et al. |
| 8,381,815 B2 | 2/2013 | Karanikas et al. |
| 8,392,163 B2 | 3/2013 | Liu |
| 8,427,904 B2 | 4/2013 | Miller et al. |
| 8,560,476 B2 | 10/2013 | Anderson et al. |
| 8,578,000 B2 | 11/2013 | Van Wie et al. |
| 8,638,328 B2 | 1/2014 | Lin |
| 8,727,017 B2 | 5/2014 | Hilliard et al. |
| 8,731,872 B2 | 5/2014 | Czernuszenko et al. |
| 8,731,873 B2 | 5/2014 | Walker et al. |
| 8,731,875 B2 | 5/2014 | Hilliard et al. |
| 8,736,600 B2 | 5/2014 | Lin et al. |
| 8,751,208 B2 | 6/2014 | Brouwer |
| 8,797,319 B2 | 8/2014 | Lin |
| 8,803,878 B2 | 8/2014 | Andersen et al. |
| 8,812,334 B2 | 8/2014 | Givens et al. |
| 8,849,639 B2 | 9/2014 | Brown et al. |
| 8,849,640 B2 | 9/2014 | Holl et al. |
| 8,868,540 B2 | 10/2014 | Ture et al. |
| 8,931,580 B2 | 1/2015 | Cheng et al. |
| 9,123,161 B2 | 9/2015 | Adair et al. |
| 2002/0049575 A1 | 4/2002 | Jalali et al. |
| 2002/0177955 A1 | 11/2002 | Jalali et al. |
| 2004/0012670 A1 | 1/2004 | Zhang |
| 2005/0119959 A1 | 6/2005 | Eder |
| 2005/0120242 A1 | 6/2005 | Mayer et al. |
| 2005/0171700 A1 | 8/2005 | Dean |
| 2006/0224423 A1 | 10/2006 | Sun et al. |
| 2006/0235666 A1* | 10/2006 | Assa ............... G01V 11/00 703/10 |
| 2006/0247903 A1 | 11/2006 | Schottle |
| 2006/0265508 A1 | 11/2006 | Angel et al. |
| 2007/0027666 A1* | 2/2007 | Frankel ............... E21B 43/00 703/10 |

(56) References Cited

U.S. PATENT DOCUMENTS

| | | |
|---|---|---|
| 2007/0088707 A1 | 4/2007 | Durgin et al. |
| 2007/0185696 A1 | 8/2007 | Moran et al. |
| 2007/0199721 A1 | 8/2007 | Givens et al. |
| 2007/0266082 A1 | 11/2007 | McConnell et al. |
| 2007/0294034 A1 | 12/2007 | Bratton et al. |
| 2008/0088621 A1 | 4/2008 | Grimaud et al. |
| 2008/0154505 A1 | 6/2008 | Kim et al. |
| 2008/0165185 A1 | 7/2008 | Smith et al. |
| 2008/0306803 A1 | 12/2008 | Vaal et al. |
| 2009/0027380 A1 | 1/2009 | Rajan et al. |
| 2009/0027385 A1 | 1/2009 | Smith |
| 2009/0037114 A1 | 2/2009 | Peng et al. |
| 2009/0125362 A1 | 5/2009 | Reid et al. |
| 2009/0132170 A1 | 5/2009 | Krueger et al. |
| 2009/0157367 A1 | 6/2009 | Meyer et al. |
| 2009/0182541 A1 | 7/2009 | Crick et al. |
| 2009/0222742 A1 | 9/2009 | Pelton et al. |
| 2009/0229819 A1 | 9/2009 | Repin et al. |
| 2009/0240564 A1 | 9/2009 | Boerries et al. |
| 2009/0295792 A1 | 12/2009 | Liu et al. |
| 2009/0299709 A1 | 12/2009 | Liu |
| 2009/0319243 A1 | 12/2009 | Suarez-Rivera et al. |
| 2010/0057418 A1 | 3/2010 | Li et al. |
| 2010/0191516 A1 | 7/2010 | Benish et al. |
| 2010/0206559 A1 | 8/2010 | Sequeira, Jr. et al. |
| 2010/0214870 A1 | 8/2010 | Pepper et al. |
| 2010/0225642 A1 | 9/2010 | Murray et al. |
| 2010/0235154 A1* | 9/2010 | Meurer ............... G01V 11/00 703/10 |
| 2010/0283788 A1 | 11/2010 | Rothnemer et al. |
| 2011/0002194 A1* | 1/2011 | Imhof ................. G01V 1/32 367/53 |
| 2011/0029293 A1 | 2/2011 | Petty et al. |
| 2011/0044532 A1 | 2/2011 | Holl et al. |
| 2011/0054857 A1 | 3/2011 | Moguchaya |
| 2011/0063292 A1* | 3/2011 | Holl ................... E21B 49/00 345/420 |
| 2011/0074766 A1 | 3/2011 | Page et al. |
| 2011/0099547 A1 | 4/2011 | Banga |
| 2011/0107246 A1 | 5/2011 | Vik |
| 2011/0112802 A1 | 5/2011 | Wilson et al. |
| 2011/0115787 A1 | 5/2011 | Kadlee |
| 2011/0126192 A1 | 5/2011 | Frost et al. |
| 2011/0153300 A1 | 6/2011 | Holl et al. |
| 2011/0161133 A1 | 6/2011 | Staveley et al. |
| 2012/0137281 A1 | 5/2012 | Kleiner et al. |
| 2012/0150449 A1 | 6/2012 | Dobin |
| 2012/0166166 A1 | 6/2012 | Czernuszenko |
| 2013/0112407 A1 | 5/2013 | Cheng et al. |
| 2013/0140037 A1 | 6/2013 | Sequeira, Jr. et al. |
| 2013/0179136 A1* | 7/2013 | Tiwari ............... G06F 17/5009 703/10 |
| 2013/0198669 A1* | 8/2013 | Gao ................... G01V 99/005 715/771 |
| 2013/0317798 A1 | 11/2013 | Cheng et al. |
| 2013/0338984 A1 | 12/2013 | Braaksma et al. |
| 2013/0338987 A1* | 12/2013 | Cheng ................ G01V 99/005 703/10 |
| 2014/0278117 A1 | 9/2014 | Dobin et al. |
| 2014/0365192 A1 | 12/2014 | Cheng et al. |
| 2015/0049084 A1 | 2/2015 | Cheng et al. |
| 2015/0094994 A1 | 4/2015 | Sequeira, Jr. |
| 2016/0003008 A1 | 1/2016 | Uribe et al. |
| 2016/0011332 A1* | 1/2016 | AlQahtani ............ E21B 43/30 703/10 |

FOREIGN PATENT DOCUMENTS

| | | |
|---|---|---|
| WO | WO 2000/014574 | 3/2000 |
| WO | 2007/106244 | 9/2007 |
| WO | 2009/094064 | 7/2009 |

OTHER PUBLICATIONS

International Search Report and Written Opinion for corresponding PCT Application No. PCT/US2011/058977, 13 pgs.

L.M. Hirsch et al., "Graph Theory Applications to Continuity and Ranking in Geologic Models", Computers & Geosciences vol. 25 (1999), 127-139.

P. Vrolijk et al., "Reservoir Connectivity Analysis—Defining Reservoir Connections and Plumbing", SPE 93577 (2005) 23 pgs.

M. Ellen Meurer et al., "Reservoir Connectivity: Definitions, Strategies, and Applications", AAPG Search and Discovery Article 90077, 1 pg.

Larry T. Sumpter et al., "Interpreting Static and Dynamic Connectivity Across Potential Structural and Stratigraphic Boundaries: A Case Study in a Mature Oil Field", AAGP Search and Discovery Article 90078 presented at 2008 AAPG Annual Convention.

Bharat, K, et al. (2001), "Who Links To Whom: Mining Linkage Between Web sites", *Proceedings of the 2001 IEE Int'l Conf. on Data Mining*, pp. 51-58.

Cabral, B., et al (1995), "Accelerated Volume Rendering and Tomographic Reconstruction Using Texture Mapping Hardware", *IEEE in Symposium on Volume Visualization*, pp. 91-98, 131.

Crawfis, R., et al. (1992), "Direct Volume Visualization of Three-Dimensional Vector Fields", *Proceedings of the 1992 Workshop on Volume Visualization*, pp. 55-60.

Dhillon, S. (2008), "Managing License Incompatibilities Distributing Eclipse Application Stacks", Thesis, pp. 1-116.

Drebin, R., et al. (1988), "Volume Rendering", *Computer Graphics, the Proceedings of 1988 SIGGRAPH Conference*, vol. 22, No. 4, pp. 65-74.

Lorensen, W., et al., (1987), "Marching Cubes: A High-Resolution 3D Surface Construction Algorithm", *Computer Graphics, The Proceeding of 1987 SIGGRAPH Conference*, vol. 21, No. 4, pp. 163-169.

McCann, P., et al. (2003), "Horizontal Well Path Planning and Correction Using Optimization Techniques," *J. of Energy Resources Tech.* 123, pp. 187-193.

Mugerin. C., et al. (2002), "Well Design Optimization: Implementation in GOCAD," $22^{nd}$ Gocade Meeting, Jun. 2002 pp. 1-14.

Rainaud, J.F., et al. (2004), "WOG—Well Optimization by Geosteering: A Pilot Software For Cooperative Modeling On Internet," *Oil & Gas Science & Tech.* 59(4), pp. 427-445.

Reed, P., et al. (2003) "Simplifying Multiobjective Optimization Using Genetic Algorithms," Proceedings of World Water and Environmental Resources Congress, 10 pgs.

Udoh, E., et al. (2003), "Applications of Strategic Optimization Techniques To Development and Management of Oil and Gas Resources", $27^{th}$ SPE Meeting, 16 pgs.

Yuen, B.B.W., et al. (2011) "Optimizing Development Well Placements Within Geological Uncertainty Utilizing Sector Models" SPE 148017. Paper prepared for presentation at the SPE Reservoir Characterisation and Simulation Conference and Exhibition held in Abu Dhabi, UAE, Oct. 9-11, 2011.

\* cited by examiner

200

700

|  | v1 | v2 | v3 | v4 | v5 | v6 | v7 |
|---|---|---|---|---|---|---|---|
| v1 | 0 | 4 | 3 | 0 | 0 | 0 | 0 |
| v2 | 0 | 0 | 1 | 2 | 5 | 0 | 0 |
| v3 | 0 | 0 | 0 | 0 | 6 | 3 | 0 |
| v4 | 0 | 0 | 0 | 0 | 0 | 0 | 5 |
| v5 | 0 | 0 | 0 | 0 | 5 | 0 | 6 |
| v6 | 0 | 0 | 0 | 0 | 0 | 0 | 4 |
| v7 | 0 | 0 | 0 | 0 | 0 | 0 | 0 |

700

800

800

1100

RESERVOIR CONNECTIVITY ANALYSIS IN A 3D EARTH MODEL

CROSS-REFERENCE TO RELATED APPLICATION

This application is the National Stage entry under 35 U.S.C. 371 of PCT/US2011/058977 that published as WO 2012/115689 and was filed on 2 Nov. 2011, which claims the benefit of U.S. Provisional Application No. 61/444,921, filed on 21 Feb. 2011 entitled RESERVOIR CONNECTIVITY ANALYSIS IN A 3D MODEL, the entireties of which are incorporated by reference herein.

FIELD OF THE INVENTION

The present techniques relate to computer implementation of tools for the interpretation of reservoir connectivity models. In particular, an embodiment of the present techniques relates to a mathematical graph structure (representation) of key elements controlling the connectivity of a reservoir.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

Three-dimensional (3D) model construction and visualization commonly employs data stored in a data volume organized as a structured grid or an unstructured grid. Data stored in a data volume may comprise a data model that corresponds to one or more physical properties about a corresponding region that may be of interest. Physical property model construction and data visualization have been widely accepted by numerous disciplines as a mechanism for analyzing, communicating, and comprehending complex 3D relationships. Examples of physical regions that can be subjected to 3D analysis include the earth's subsurface, facility designs, and the human body.

In the field of hydrocarbon exploration, analysis of a reservoir's connectivity facilitates characterizing the reservoir. Moreover, connectivity analysis may affect decisions made in all phases of hydrocarbon resource development of an asset's life cycle, such as exploration and production. Connectivity assessments can affect decisions such as determining optimal well locations in addition to the management reservoir decisions.

In one technique, a set of rules and processes allows geologists to identify compartments from reservoir geometry. Typically, compartment identification starts with structure maps. Structural features, stratigraphic features, and the limits of top seal or base seal define compartment boundaries. Even without knowledge of fluid contacts, depths, and pressure conditions, one can identify potential compartment boundaries from the maps based on a few simple rules of the structural and stratigraphic features. That is, one can evaluate the relevance of compartment boundaries defined by top-seal or base-seal. Traditional spill points on convex-upward closures and down-dip tips of faults or other structural or stratigraphic barriers are only relevant on top-of-reservoir maps. Break-over points, including those associated with concave-upward closures and up-dip tips of faults or other structural or stratigraphic barriers, are only relevant on base-of-reservoir maps. Even though the rules to identify compartments based on the structure maps are relatively simple, the process of identification typically relies on the geologists' manual identification of compartment boundaries and contact relations among boundaries based on the contour or cross section displays of structural surfaces.

Current processes for compartment identification rely on geologists' knowledge and step-by-step procedures to first identify compartment boundaries. The contacts from compartment boundaries may then be used to identify the spill-over or break-over points among compartments. The current methods may make handling the uncertainty of the structural and stratigraphic features difficult, if not impossible. Various examples of reservoir connectivity analysis techniques are discussed in the following paragraphs.

U.S. Patent Application Publication No. 2007/0027666 to Frankel discloses methods and systems for characterizing connectivity in reservoir models using paths of least resistance. An embodiment is stated to be related to computer modeling of the transmission of properties, such as the flow of fluids within subsurface geological reservoirs. Further, an embodiment is stated to include a method of evaluating the transmission of a property within a subsurface geologic reservoir using a graph-theory single source shortest path algorithm.

U.S. Patent Application Publication No. 2008/0154505 to Kim, et al. discloses a rapid method for reservoir connectivity analysis using a fast marching method. A model of a portion of the reservoir is stated to be divided into cells, where each cell is stated to have a volume and some attributes, and wherein a speed function is stated to be assigned to a portion of the cells. A reference cell is stated to be chosen. A connectivity between cells in the reservoir is stated to be determined by solving an Eikonal equation that describes the travel time propagation, said propagating front progressing outward from a reference cell until an ending condition is met, said Eikonal equation being solved by a fast marching method with propagation velocity as a function of spatial position being provided by the speed function. Regions of the reservoir are stated to be characterized by their connective quality to the reference cell using the connectivity.

U.S. Pat. No. 6,549,879 to Cullick, et al. discloses determining optimal well locations from a 3D reservoir model. Various constraints are stated to be satisfied. In the first stage, the wells are stated to be placed assuming that the wells can only be vertical. In the second stage, these vertical wells are stated to be examined for optimized horizontal and deviated completions. This solution is stated to be expedient, systematic, and provide a good first-pass set of well locations and configurations. The first stage solution is stated to formulate the well placement problem as a binary integer programming (BIP) problem which uses a "set-packing" approach that exploits the problem structure, strengthens the optimization formulation, and reduces the problem size. Commercial software packages are readily available for solving BIP problems. The second stage is stated to sequentially consider selected vertical completions to determine well trajectories that connect maximum reservoir pay values while honoring configuration constraints including completion spacing constraints, angular deviation constraints, and maximum length constraints. The parameter to be optimized in both stages is stated to be a tortuosity-adjusted reservoir quality. An algorithm is stated to be disclosed for calculating the tortuosity-adjusted quality values.

U.S. Pat. No. 7,069,149 to Goff, et al. discloses a process for interpreting faults from a fault-enhanced 3D seismic attribute volume. The method is stated to include the steps of extracting faults from a 3D seismic attribute cube, and then calculating a minimum path value for each voxel of the 3-D seismic attribute cube. A fault network skeleton is stated to be extracted from the 3D seismic attribute cube by utilizing the minimum path values which correspond to voxels within the 3D seismic attribute cube. The individual fault networks are stated to be labeled, and a vector description of the fault network skeleton is stated to be created. The fault network skeleton is stated to be subdivided into individual fault patches wherein the individual fault patches are the smallest, non-intersecting, non-bifurcating patches that lie on only one geologic fault. The individual fault patches are then stated to be correlated into a representation of geologic faults.

International Patent Application Publication No. WO2007/106244 to Li, et al. discloses a method for quantifying reservoir connectivity using fluid travel times. In the method, fluid travel time models are stated to be constructed from a reservoir model. Then, reservoir connectivity measures are stated to be calculated from the fluid travel time models and analyzed to determine a location for at least one well. Based on the analysis, one or more wells may be drilled and hydrocarbons produced.

L. M. Hirsch et al., "Graph Theory Applications to Continuity and Ranking in Geologic Models", Computers & Geosciences, Volume 25, Number. 2, p. 127-139, states that most of the currently available analysis tools for geologic modeling cannot easily handle irregularities such as faults, onlap and truncations, or they are strongly limited in the dimensions of the models that are amenable to analysis. The article proposes an algorithmic graph theory for computationally efficient, continuity analysis. This method is stated to treat irregularities in the geologic model including unstructured grids of unequal cell sizes. Geologic models are stated to be transformed from a cell-based representation to a node- and connection-based representation, where both nodes and arcs (connections) can have associated properties. Quantities such as connected components, maximum flow, shortest paths, minimum-cost paths and many other connectivity measures are stated to be determined. These connectivity measures are stated to involve connections whose lengths or values are weighted by reservoir parameters such as porosity and permeability. Because graph algorithms are efficient, connectivity is stated to be rapidly evaluated for different wells that might become important during reservoir development. Graph theory algorithms are stated to be applied to rank the anticipated flow performance of different geologic model realizations, to aid in delineating contiguous regions of similar character for use in up-scaling, as well as to assess how well a scaled-up model preserves the continuity of the original detailed geologic model.

P. J. Vrolijk, et al., "Reservoir Connectivity Analysis—Defining Reservoir Connections and Plumbing", SPE Middle East Oil and Gas Show and Conference, Kingdom of Bahrain (2005), states that gas, oil, and water fluids in channelized or faulted reservoirs can create complex reservoir plumbing relationships. Variable hydrocarbon contacts can develop when some, but not all, fluids are in pressure communication. Reservoir Connectivity Analysis (RCA) is a series of analyses and approaches to integrate structural, stratigraphic, and fluid pressure and composition data into permissible but non-unique scenarios of fluid contacts and pressures. RCA provides the basis for fluid contact and pressure scenarios at all business stages, allowing the creation of fluid contact and segmentation scenarios earlier in an exploration or development setting, and the identification of by-passed pays or new exploration opportunities in a production setting. Combining conventional structural and fault juxtaposition spill concepts with a renewed appreciation of fluid breakover (contacts controlled by spill of pressure-driven, denser fluid, like water over a dam) and capillary leak (to define the ratio of gas and oil where capillary gas leak determines the gas-oil contact (GOC)), permissible but non-unique scenarios of the full fluid fill, displacement, or spill pathways of a hydrocarbon accumulation are defined, comprising single or multiple reservoir intervals.

Additional examples of known reservoir data analysis techniques can be found in U.S. Pat. No. 6,823,266 to Czernuszenko et al., "Reservoir Connectivity: Definitions, Strategies, and Applications" by M. Meurer et al., and PCT Application PCT/US2008/084327 to M. Meurer et al.

SUMMARY

An exemplary embodiment of the present techniques comprises a method for reservoir connectivity analysis in a three-dimensional (3D) earth model where a subsurface region is identified. A baseline reservoir connectivity model is obtained from the subsurface region, and compartments and/or connections are determined from the baseline reservoir connectivity model using reservoir connectivity analysis. A set of 3D objects is created, representing the compartments and/or connections from the 3D earth model and a mathematical graph structure is created from the 3D objects. Reservoir connectivity scenarios are evaluated based on analysis of the mathematical graph structure and 3D objects.

BRIEF DESCRIPTION OF THE DRAWINGS

Advantages of the present techniques may become apparent upon reviewing the following detailed description and drawings of non-limiting examples of embodiments in which.

DETAILED DESCRIPTION

Figure 1:
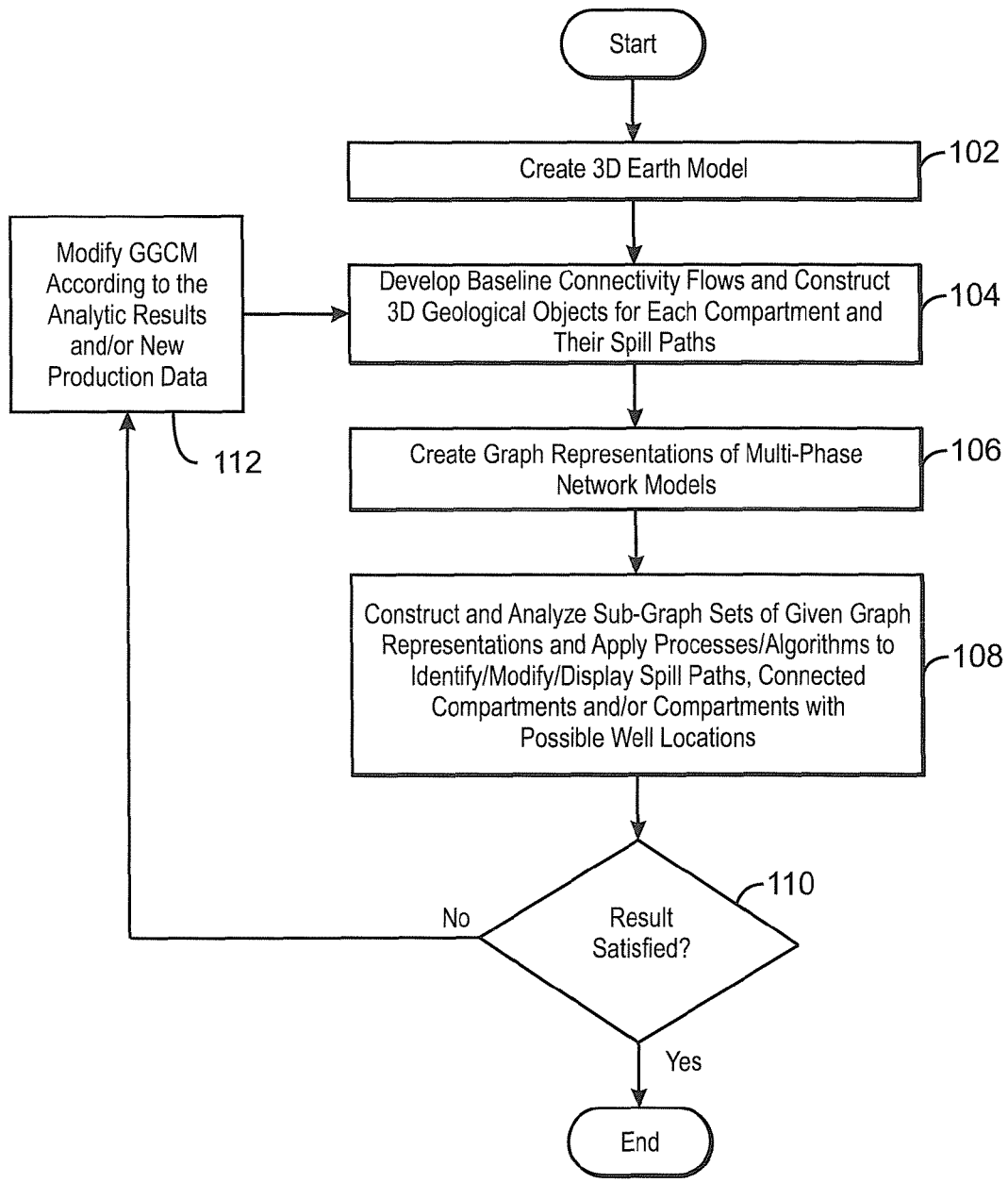
FIG. 1 is a process flow diagram summarizing a method of analyzing a graph/geometrical reservoir connectivity model.

In the following detailed description section, specific embodiments are described in connection with preferred embodiments. However, to the extent that the following description is specific to a particular embodiment or a particular use, this is intended to be for exemplary purposes only and simply provides a description of the exemplary embodiments. Accordingly, the present techniques are not limited to embodiments described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

The term "break-over" refers to a loss of a denser fluid driven by overpressure at a break or saddle in the base-seal.

The term "cell" refers to a collection of faces, or a collection of nodes that implicitly define faces, where the faces together form a closed volume. Additionally, the term "face" refers to an arbitrary collection of points that form a surface.

The terms "compartment" or "reservoir compartment" refer to a trap containing no identified barriers that would allow the contact between two fluids to reach equilibrium at more than one depth.

The term "computer component" refers to a computer-related entity, either hardware, firmware, software, a combination thereof, or software in execution. For example, a computer component can be, but is not limited to being, a process running on a processor, a processor, an object, an executable, a thread of execution, a program, or a computer. One or more computer components can reside within a process or thread of execution and a computer component can be localized on one computer or distributed between two or more computers.

The terms "non-transitory, computer-readable medium", "tangible machine-readable medium" or the like refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and art-recognized equivalents and successor media, in which the software implementations embodying the present techniques are stored.

The term "DCA" refers to dynamic reservoir connectivity analysis. In a DCA work flow, a reservoir connectivity model based on the geologic time scale and production time scale reservoir connectivity for the subsurface region is constructed, wherein the reservoir connectivity model includes a plurality of production scenarios each including reservoir compartments, connections, and connection properties for each scenario. Each of the production scenarios is tested and refined based on production data for the subsurface region.

The term "earth model" refers to a geometrical model of a portion of the earth that may also contain material properties. The model is shared in the sense that it integrates the work of several specialists involved in the model's development (non-limiting examples may include such disciplines as geologists, geophysicists, petrophysicists, well log analysts, drilling engineers and reservoir engineers) who interact with the model through one or more application programs.

The term "graph theory" refers to the study of graphs as mathematical structures used to model pairwise relations between objects from a certain collection. Graph theory has been used extensively in solving problems such as traffic simulation of transport networks, circuit analysis, flow analysis, reservoir simulation, etc.

The term "property" refers to data representative of a characteristic associated with different topological elements on a per element basis. Generally, a property could be any computing value type, including integer and floating point number types or the like. Moreover, a property may comprise vectors of value types. Properties may only be valid for a subset of a geometry object's elements. Properties may be used to color an object's geometry. The term "property" may also refer to characteristic or stored information related to an object. Application of the appropriate definition is intuitive to one skilled in the art of computer science.

The term "RCA" refers to reservoir connectivity analysis. In a RCA work flow, all stratigraphic and structural reservoir compartments are identified and the connections that trace the path of fluid displacement when a droplet of oil or gas is added to any individual reservoir compartment are described. A fundamental assumption of RCA is a steady-state fluid distribution appropriate to a pre-production fluid state.

The term "seal" refers to impermeable rocks that keep hydrocarbons in place and prevent them from escaping to the surface. An example of a seal would be a layer of the rock type shale.

The term "seismic data" refers to a multi-dimensional matrix or grid containing information about points in the subsurface structure of a field, where the information was obtained using seismic methods. Seismic data typically is represented using a structured grid. Seismic attributes or properties are cell or voxel based. Seismic data may be volume rendered with opacity or texture mapped on a surface.

The term "spill" refers to an escape of a more buoyant fluid at a break or cusp in the top-seal.

The term "structured grid" refers to a matrix of volume data points known as voxels. Structured grids are typically used with seismic data volumes or medical imaging.

The term "topological elements" refers to the building blocks of an object. Points, faces, or cells are the most common examples.

The term "unstructured grid" refers to a collection of cells with arbitrary geometries. Each cell can have the shape of a prism, hexahedron, or other more complex 3D geometries. When compared to structured grids, unstructured grids can better represent actual data since unstructured grids can contain finer cells in one area with sudden changes in value of a property, and coarser cells elsewhere where the value of the property changes more slowly. Finer cells may also be used in areas having more accurate measurements or data certainty, for example, in the vicinity of a well. The flexibility to define cell geometry allows the unstructured grid to represent physical properties better than structured grids. In addition, unstructured grid cells can also better resemble the actual geometries of subsurface layers because cell shape is not restricted to a cube and may be given any orientation. However, in an unstructured grid, cell geometries and locations are explicitly stored and, thus, an unstructured grid may require a substantial amount of memory. Unstructured grids may be employed in connection with reservoir simulation models. Note that the term unstructured grid relates to how data is defined and does imply that the data itself has no structure. For example, one could represent a seismic model as an unstructured grid with explicitly defined nodes and cells. The result would necessarily be more memory intensive and inefficient to process and visualize than the corresponding structured definition.

The terms "visualization engine" or "VE" refer to a computer component that is adapted to present a model and/or visualization of data that represents one or more physical objects.

The term "voxel" refers to the smallest data point in a 3D volumetric object. Each voxel has unique set of coordinates and contains one or more data values that represent the properties at that location. Each voxel represents a discrete sampling of a 3D space, similar to the manner in which pixels represent sampling of the 2D space. The location of a voxel can be calculated by knowing the grid origin, unit vectors and the indices of the voxel. As voxels are assumed to have similar geometries (such as cube-shaped), the details of the voxel geometries do not need to be stored and, thus, structured grids require relatively little memory. However, dense sampling may be needed to capture small features, therefore increasing computer memory usage requirements.

The term "well" refers to a surface location with a collection of wellbores. Wells may be visually rendered as a point or a glyph, along with a name.

The term "wellbore" refers to a constituent underground path of a well and associated collections of path dependent data. A wellbore may be visually rendered as a collection of connected line segments or curves. Wellbores may also be visually rendered cylindrically with a radius.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

An aspect provides a process for constructing, describing, and interrogating a permissible reservoir connectivity model and may be referred to as a "Graph/Geometrical Connectivity Model" (GGCM). The process may use geometrical algorithms or operations to construct geometrical representations of reservoir connectivity analysis (RCA) specific geological objects in a 3D earth environment and may utilize graph theory algorithms to derive a mathematic graph structure of a group of these objects. One aspect may apply to a permissible reservoir connectivity model based on a static geological time scale, and also to a dynamic production time scale fluid connection and distribution for a given subsurface region. An aspect may also provide a systematic construct which may be used to make current RCA and DCA work flows more suitable for a 3D earth environment.

Prior to finalizing a permissible GGCM, compartments in the reservoir of interest should be identified. Identification of reservoir compartments may be performed by analysis of reservoir geometry. To facilitate the explanation of the processes described herein, an explanation of compartment identification and connectivity analysis on a static geological time-scale is provided.

Generally, the work process of reservoir connectivity analysis (RCA) on a static time scale yields a logically permissible, but non-unique interpretation of compartments or connections in a petroleum region. This work process is generally accomplished by first identifying compartments based on geologic interpretation of seismic data, such as horizons, fault planes and stratigraphic framework. Then, fluid connections and exit points can be identified for each compartment based on the previous steps and fluid interpretation, such as petro-physical log interpretation, fluid temperature, fluid pressure, fluid composition, and capillary pressure. Next, fluid contacts can be identified. From the information above, a diagram showing compartments and connections can be constructed among compartments.

An assumption of the RCA process described above is a steady-state fluid distribution appropriate to a pre-production fluid state. Extension of RCA to a production-scale reservoir connectivity analysis may be known as "dynamic connectivity analysis" (DCA). To accomplish DCA, steady-state system fluid exits can be established using production data. Second, compartment exits and paths to system fluid exits can be established using production data. Third, interpreted elements can be identified that control fluid contacts, and associated uncertainties can be documented with interpreted elements. Fourth, fluid pressure evolution can be evaluated, and cumulative pre-well production data can be reconciled with fluid contacts and pressure evolution. Fifth, any changes in the chemistry of produced fluids can be reconciled. Finally, saturation and pressure changes can be interpreted based on 4D seismic data. 4D seismic data may refer to initially performing a seismic survey of a subsurface region, then performing one or more later seismic surveys of the same region while attempting to duplicate the acquisition parameters and conditions as closely as possible.

In the workflow described above, multiple production-time specific static diagrams, charts, and 2D maps or cross section views may be necessary to comprehend the (dynamic) relationships of fluid movement, a structurally complex reservoir, and production over time. Because of constraints of the available data and the complexity of the multi-phased model scenarios, coupled with the uncertainty of exact geometries of compartments and exact spill over or break over locations, it can be difficult for geologists and reservoir engineers to make consistent predictions without mathematical abstraction and assistance.

In one aspect, a method is provided for mathematical data abstraction into a systematic framework to facilitate decision making processes at every stage of reservoir connectivity analysis. The method can use a mathematical framework, known as graph theory, to provide data representation and algorithms. The use of graph-theoretic methods together with geometrical processing in a 3D earth environment may facilitate the analysis of multi-phase or time-variant connection networks and complex reservoir connectivity models. Further, it may also improve RCA/DCA model construction and quality by the incorporation of uncertainty regarding the exact location of compartments and fluid contact elevations.

In graph theory, a graph G(V,E) is a mathematic abstraction, represented as a collection of points (V: vertices) and lines (E: edges) connecting subsets of points. In a directed-graph representation, an edge can be represented by a directed arc. A path in a graph can be represented as a sub-graph of G having a series of vertices and edges.

In the field of geometrical constructions, geological objects represented as gridded-surfaces, polygons, points, or geo-body cells, can be identified and constructed using geometrical-based algorithms such as surface intersection algorithms and other topological analyses. An aspect of the disclosed techniques may also utilize geometrical processes, such as surface intersection and flow path constructions based on the 3D geological objects for the purposes of visualization and analysis of the dynamic fluid flows in a 3D earth environment. If regular and/or unstructured reservoir grids are used, cell-based algorithms such as geo-body detection can also be used. Three-dimensional geological objects such as compartments, spill/break-over locations, and flow paths may correspond to vertices, edges and combinations of those in the graph G(V,E).

A method of constructing a GGCM is described herein that utilizes a graph-theoretic framework and geometrical objects within a 3D environment for the purpose of construction, prediction and analyses of reservoir connectivity models. Graph-based algorithms and tools may be used to assist in identifying critical flow paths and topological relations among various compartments. Geometrical algorithms may be used to create and isolate key geometrical objects to interactively visualize geometric relationships between compartments and interpreted connection pathways in a 3D visual environment.

Figure 2:
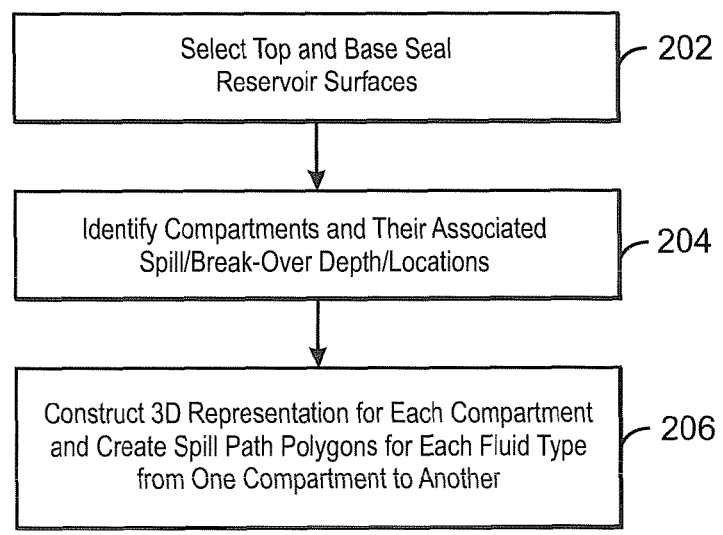
FIG. 2 is a process flow diagram summarizing a method of creating a baseline graph/geometrical reservoir connectivity model.

FIG. 1 is a process flow diagram 100 summarizing a method of analyzing a graph/geometrical reservoir connectivity model. At block 102, a three-dimensional (3D) earth model of one or more potential reservoirs can be created using geological objects such as horizons and faults, as well as earth petro physical properties such as porosity. Production information, such as data collected from wells, may also be incorporated into the 3D earth model. At block 104, a baseline RCA/DCA model can be created. FIG. 2 further describes the creation of a baseline RCA/DCA model, which may involve three-dimensional object construction.

At block 106, a graph representation G(V,E) of the RCA/DCA model can be created. The graph representation may be referred to as a GGCM. The compartments identified at block 104 can be denoted by vertices with properties such as, for example, fluid contacts and compartment pressure information. The connections representing connecting paths of gas, oil, or water identified at block 104 can be denoted by edges with properties such as spill point depths, break-over locations, and fluid flow capacity.

At block 108, the analysis sessions occur. During the analysis sessions, various constructs from a graph G can be used to evaluate the reservoir connectivity options in the GGCM. Each construct is represented by a sub-graph of G.

Block 110 determines if the resulting GGCM is satisfactory. If the result is satisfactory, the method ends. If the result is not satisfactory, process flow continues to block 112. At block 112, alternate scenarios and interpretations may be tested by modifying the model. Modifying the model may entail splitting or merging compartments and their connection pathways based on the contact information, fluid properties or production data. The method then returns to block 104.

FIG. 2 is a process flow diagram 200 summarizing a method of creating a baseline graph/geometrical reservoir connectivity model, as discussed with respect to block 104 of FIG. 1. At block 202, top-seal and base-seal reservoir surfaces are selected. By selecting the top-seal and base-seal reservoir surfaces, a reservoir-scale container is defined. Within this container, multiple geologic features that might separate fluids with different buoyancies into isolated compartments may be identified. The compartment identification at block 204 may be based on the topology of the reservoir. For example, an anticline may trap lighter fluids such as natural gas at its crest. The crest is the point of highest elevation of a structure. On the other hand, a synclinal trap may allow for the accumulation of a heavier fluid, such as water, at its lowest point of elevation (base). A syncline is typically formed in the subsurface where rock layers are downwardly convex. Other factors, such as faults and fault seal quality, and salt structures, could also contribute to the determination of RCA/DCA compartments.

At block 204, the depths where the fluid spill over and break over from one compartment to another can be identified. The common contacts such as gas-oil (GOC), gas-water (GWC) or oil-water (OWC) may be extracted and recorded as 3D depth contour polygons on the top seal and base seal surfaces. At block 206, a set of 3D geometric objects can be created based on the identification processes described at block 204. Compartment-scale container surfaces are created to represent reservoir compartments, and flat planes/polygons are created to denote the different fluid contacts. Sets of points are created and used to represent the spill and break-over point locations. Each of these 3D geometric objects are created from the original top and base seal surfaces via the geometric operation of surface cutting and intersection.

EXAMPLES

According to certain aspects of the disclosed techniques, geometrical operations and algorithms may be used to determine the boundaries of compartments and may also be used to identify, for example, saddle locations on top or base seal surfaces which are potential spill or break-over points.

Figure 3A:
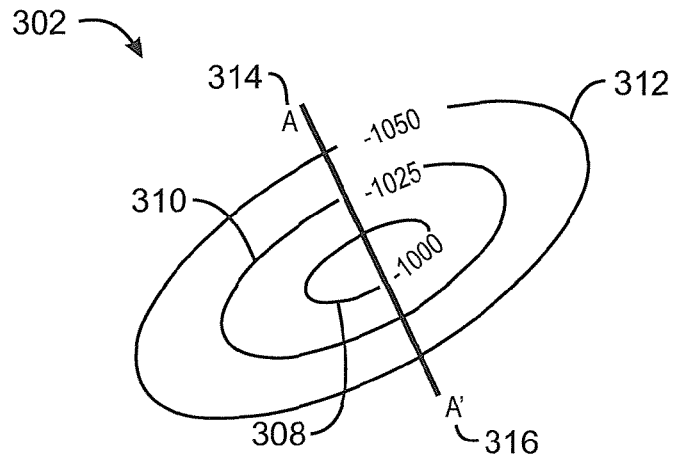
FIG. 3A is a diagram showing a top seal map.
Figure 3B:
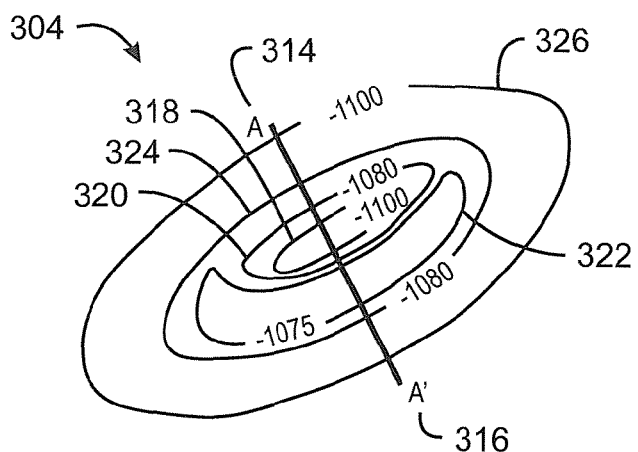
FIG. 3B is a diagram showing a bottom seal map.
Figure 3C:
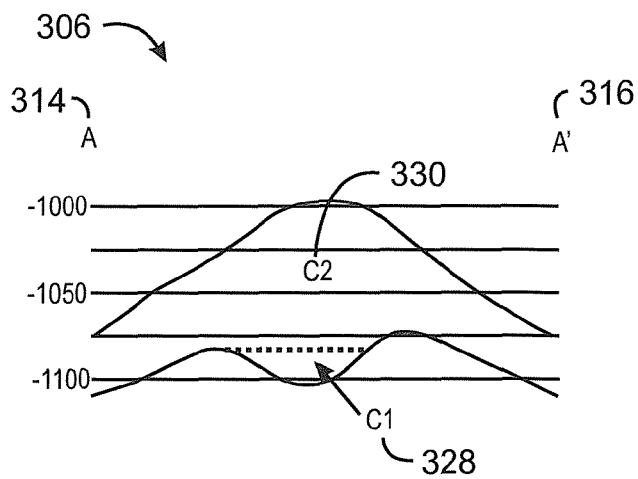
FIG. 3C is a diagram showing a cross section.

FIGS. 3A-3C are diagrams that detail the identification of compartments, for example, using structure maps as in block 104 of FIG. 1. At block 104, a baseline RCA/DCA model is created, and FIG. 2 further describes the creation of a baseline RCA/DCA model. FIG. 3A is a diagram showing a top seal map 302, FIG. 3B is a diagram showing a bottom seal map 304, and FIG. 3C is a diagram showing a cross section 306. The top seal 302 and the bottom seal 304 show a top and base seal reservoir surface respectively, as discussed herein at block 202 of FIG. 2.

On the top seal map 302 depicted in FIG. 3A, the structural contours are represented as solid polygons. A first line 308 represents a contour at a depth of −1000 along the top of the reservoir. A second line 310 represents a contour at a depth of −1025 along the top of the reservoir. Finally, a third line 312 represents a contour at a depth of −1050 along the top of the reservoir. The thick solid line in the center of the top-seal map runs from point (A) 314 to point (A') 316.

The bottom seal map 304 depicted in FIG. 3B shows a base-seal map of the base of the reservoir. The structural contours are represented as solid polygons. A first line 318 represents a contour at a depth of −1100 along the bottom of the reservoir. A second line 320 represents a contour at a depth of −1080 along the bottom of the reservoir. A third line 322 represents a contour at a depth of −1075 along the bottom of the reservoir. A fourth line 324 represents a contour at a depth of −1080 along the bottom of the reservoir. Finally, a fifth line 326 represents a contour at a depth of −1100 along the bottom of the reservoir. The thick solid line in the center of the bottom-seal map runs from point (A) 314 to point (A') 316.

The cross section 306 depicted in FIG. 3C shows a cross section taken along the line from point (A) 314 to point (A') 316 of both the top seal map 302 and the bottom seal map 304. Using geometrical operations and algorithms, two compartments are identified in a 3D earth environment. These are labeled compartment C1 328 and C2 330. The locations of the first compartment C1 328 and the second compartment C2 330 are shown in the cross section 306. The dashed line in the cross section 306 shows the depth that is identified as top of the first compartment C1 328.

Once the compartments are identified, the depths where the fluid spills and breaks-over from one compartment to another can be determined as discussed herein at block 204 of FIG. 2. Potential common fluid contacts, such as the GOC, the GWC, and the OWC can be extracted and recorded as 3D depth contour polygons on the top/base seal surfaces.

Figure 4:
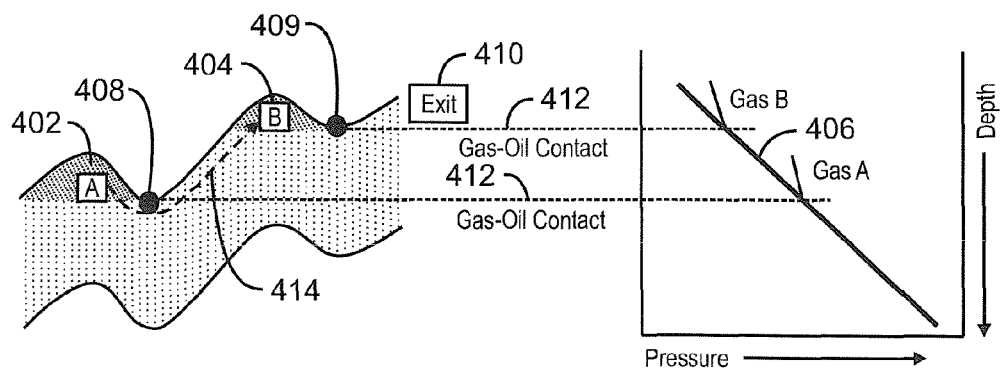
FIG. 4 is a diagram that shows two compartments.

FIG. 4 is a diagram 400 showing two compartments A 402 and B 404. In the cross sectional view, a single oil column with two different gas/oil contacts is indicated. The right hand side shows the pressure versus depth curve 406 for the oil and the two gas columns. The large black dots 408 and 409 represent spill points. At these locations, the more buoyant fluid gas spills out of the compartments to the system exit point 410.

Compartments A 402 and B 404 are identified and their geometries are represented as regions bounded by the top seal surface and the GOC planes. Fluid contact elevations, shown by dashed lines 412, may be determined from well data or from the analysis of gas and oil pressure gradients as shown on the right-hand side of the FIG. 4. A dashed line 414 shows the spill pathway from compartment A to compartment B. The same analysis can be done to determine the water columns on the base of the reservoir as described in block 204 of FIG. 2, as discussed with respect to FIG. 5.

Figure 5:
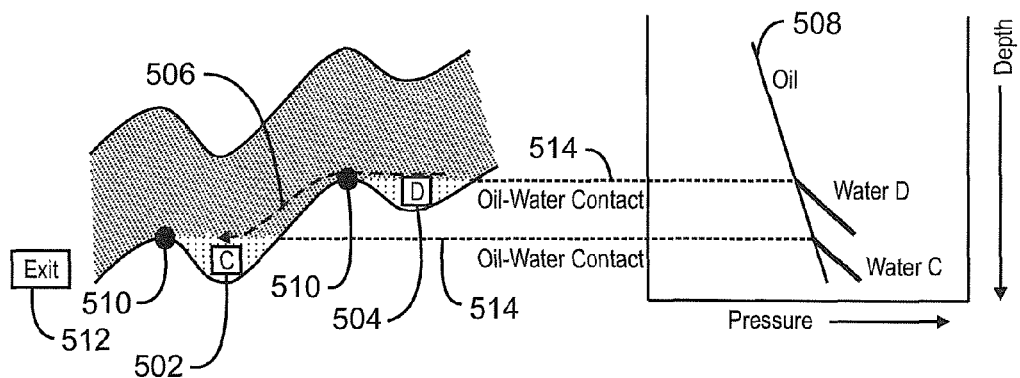
FIG. 5 is a diagram that shows two compartments.

FIG. 5 is a diagram 500 showing two compartments C 502 and D 504. In this case, water in compartment D 504 may break-over and flow into compartment C 502. A dashed line 506 shows the break-over pathway. The right hand side shows the pressure curve 508 for oil and water columns. The large black dots 510 represent the break-over points. At these locations, the less buoyant fluid water breaks over, or out of, the compartments to the system exit point 512. Compartments C 502 and D 504 are identified and their geometries are represented as regions bounded by the base seal surface and the OWC planes. Fluid contact elevations, shown by dashed lines 514, may be determined from well data or the analysis of oil and water pressure gradients as shown on the right-hand side of the FIG. 5.

As discussed herein, at block 206 of FIG. 2 a set of geometric objects can be created based on identification processes. In this step, the container surfaces may be created to represent reservoir compartments, and flat planes and polygons can be created to denote the different fluid contacts. Sets of points can be created to represent the spill and break-over point locations. The 3D geometric objects can be created from the original top and base seal surfaces via the geometric operation of surface cutting and intersection.

Figure 6:
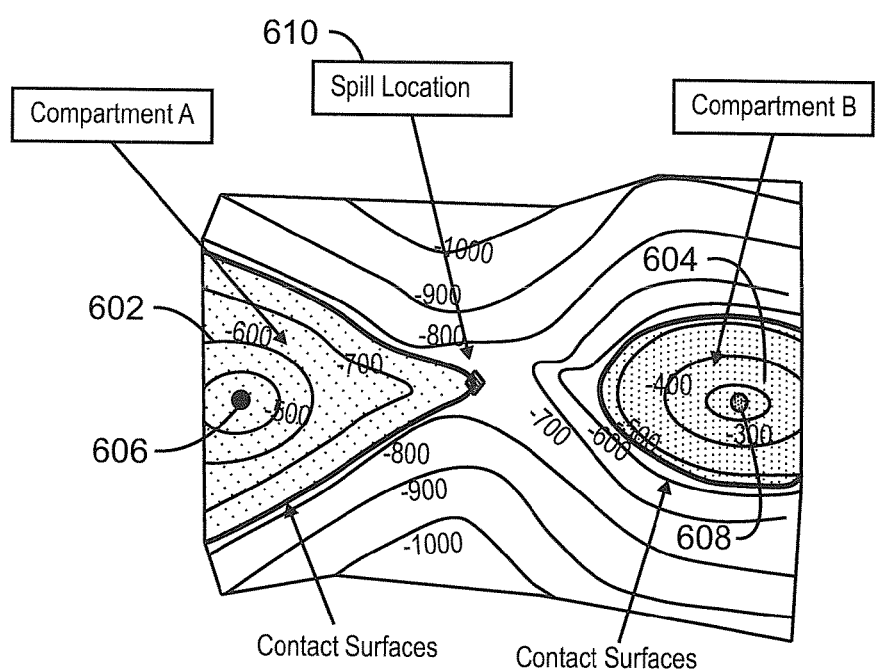
FIG. 6 is a diagram that shows a top seal map on which compartments, fluid contacts, and a spill point location can be identified.

FIG. 6 is a diagram 600 that shows a top seal map on which compartments, fluid contacts, and a spill point location can be identified. More specifically, diagram 600 shows a top seal reservoir map view of an area of a 3D earth model. Two compartment surfaces 602 and 604 are shown as shaded regions on the top-seal surface and correspond to parts of compartments A 402 and B 404 of FIG. 4, respectively. Two gas-oil contacts are planar surfaces and shown as solid polygons 606 and 608. The striped diamond shape 610 corresponds to the spill point 408 of FIG. 4, and is located at the saddle point of the top seal surface.

After block 206 of FIG. 2 has been performed, a complete set of 3D objects such as compartment-bounding surfaces, flat fluid contact planes, polygons and points have been created to describe the compartments as well as the hydrocarbon accumulations. Additional objects, such as stratigraphic connections and fault juxtapositionareas, can also be created to complete the representation of the hydrocarbon accumulations and compartments. These stratigraphic connections would represent areas, as opposed to (spill and break over) point locations, where fluids can possibly move between the various compartments.

As discussed herein at block 106 of FIG. 1, a graph representation G(V,E) of the RCA/DCA model can be created. The following example describes data abstraction using graph-theoretic representation. An exemplary aspect of the disclosed techniques may use the graph representation to abstract the reservoir connectivity in a GGCM such that a set of graph related analysis tools and algorithms can be utilized.

Figures 7A, 7B:
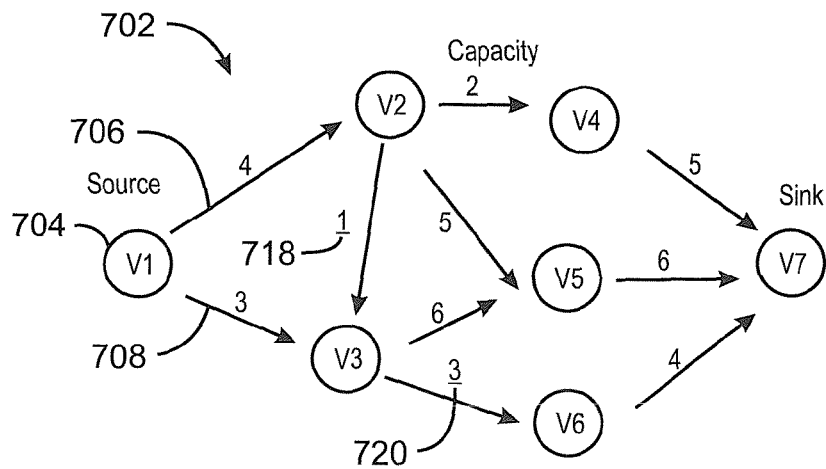
FIG. 7A is a direct graph in accordance with an aspect of the disclosed techniques.
FIG. 7B is a matrix representation in accordance with an aspect of the disclosed techniques.

FIG. 7A is a direct graph in accordance with an aspect of the disclosed techniques, as indicated by reference character 700. The graph G(V,E) at 702 has 7 vertices as shown and is represented as vertices V={vi, v2, . . . , v7} and edges E={Set of edges connecting vertices in V}. In the graph G(V,E) at 702 each vertex is denoted as a circle and each edge from one vertex to another is denoted by an arrow. The arrows from one vertex to another represents a fluid spill relationship between two compartments. The number in the center of the arrow denotes an attribute for the connection among vertices. For example, vertex 704 corresponds to vi, and is connected by an edge 706 to vertex v2, and by another edge 708 to vertex v3. In this example, the attribute represented by the vertices in graph 702 is flow rate.

FIG. 7B is a matrix representation in accordance with an aspect of the disclosed techniques, as indicated by reference character 700. Matrix 710 is a 7×7 matrix and is another representation of graph G(V,E) at 702 of FIG. 7A. Matrix 710 depicts a one-to-one relationship between the 7 vertices. For example, a "0" at location 712 corresponding to "v2-v6" indicates there is no direct connection between vertices v2 to v6. However, the value "1" at location 714 corresponding to "v2-v3" and value "3" at location 716 corresponding to "v3-v6" indicates there is an indirect connection from v2 to v6 through the v3 vertex. This indirect connection is also depicted in the graph G 702 of FIG. 7A with the value "1" at edge 718 and the value "3" at edge 720.

Figure 8A:
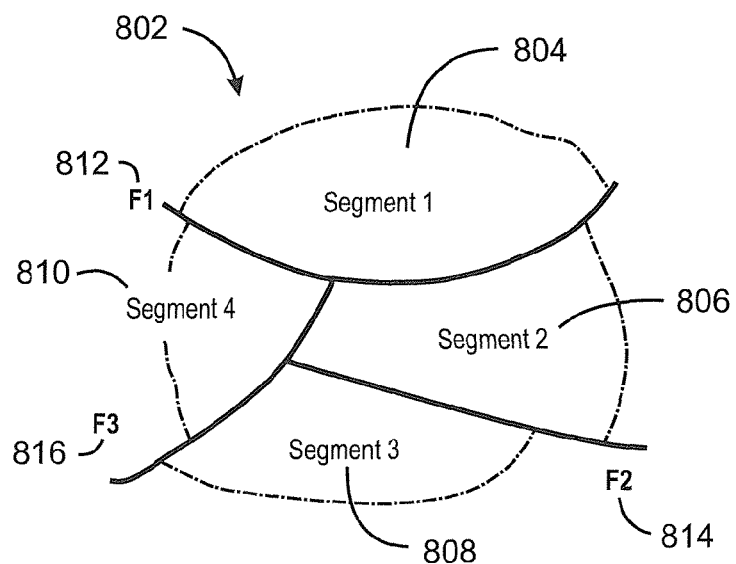
FIG. 8A is a plan view of a reservoir.

FIG. 8A is a plan view 802 of a reservoir, as indicated by reference character 800. The reservoir consists of three units, which are vertically stacked. Plan view 802 shows the three unit reservoir divided into four segments: segment 1 at 804, segment 2 at 806, segment 3 at 808, and segment 4 at 810. The reservoir is divided into segments by three faults: fault surface F1 (812), fault surface F2 (814), and fault surface F3 (816). Each segment still has three reservoir units, though these are not visible in this plan view of FIG. 8A. Using the methods described at block 104, in which a baseline RCA model is constructed, the constructed baseline RCA model in this example consists of a total of eight compartments.

Figure 8B:
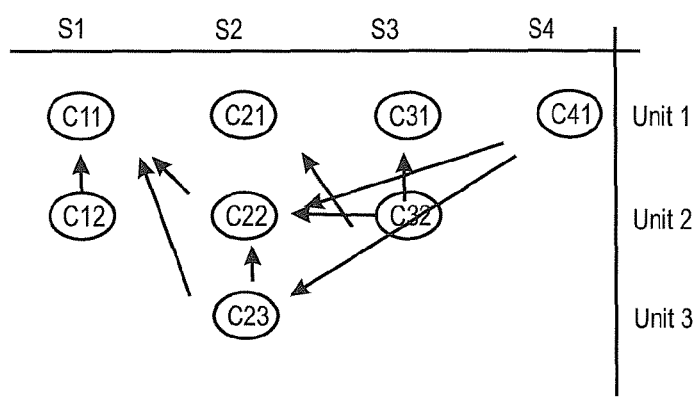
FIG. 8B is a unit view of reservoir compartments in three stratigraphic intervals.

FIG. 8B is a unit view of reservoir compartments in three stratigraphic intervals, which can also be regarded as a graph G(V, E) of the reservoir shown in FIG. 8A, as indicated by reference character 800. Each compartment is labeled as C,J where "i" is the lateral segment number and "j" is the vertical unit number for each compartment (e.g. C23 is in segment 2 and in vertical unit 3). To simplify the description in this example, gas is used as the only hydrocarbon accumulation in the eight compartments, and all gas contacts in the eight compartments are controlled by gas spill points. In FIG. 8B, the arrows from one vertex to another are used to represent the gas spill relationships between the compartments, There is no depth and geometrical information in the diagram. These types of data are stored as attributes and linked back to geological objects in the 3D earth model.

Figure 9:
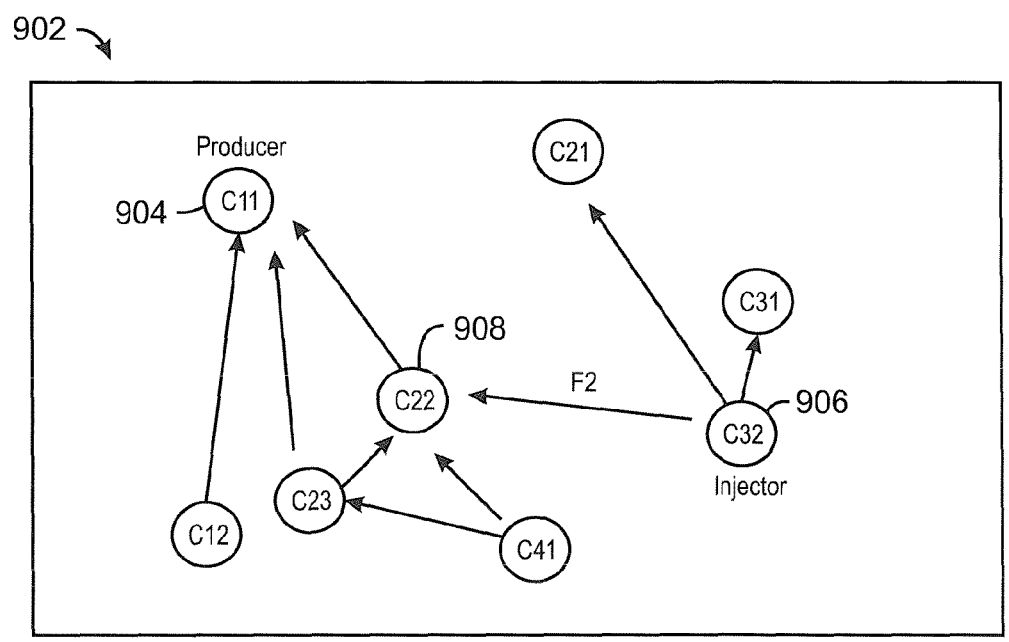
FIG. 9 is a graphical representation of a reservoir connectivity model.

An embodiment may utilize a graph abstraction and corresponding analytical algorithms to identify areas of interest like weakly and strongly connected pathways. At the same time, the methods described herein may be used to visually query the geometric components of the 3D earth model to further investigate the relationship of the underlying connectivity model. FIG. 9 is a graphical representation 902 of a reservoir connectivity model, as indicated by reference character 900, In this example, the compartment segmentation of the reservoir is the same as in FIG. 8A, and the connection from compartment $C_{32}$ to $C_{22}$ will be evaluated. For purposes of this explanation, it may be assumed that a production well is removing hydrocarbon from compartment $C_{11}$ at location 904 and an injection well is injecting water into compartment $C_{32}$ at location 906. Graph 902 shows that the only pathway from $C_{32}$ at location 906 to $C_{11}$ at location 904 is through compartment $C_{22}$ at location 908.

Figure 10:
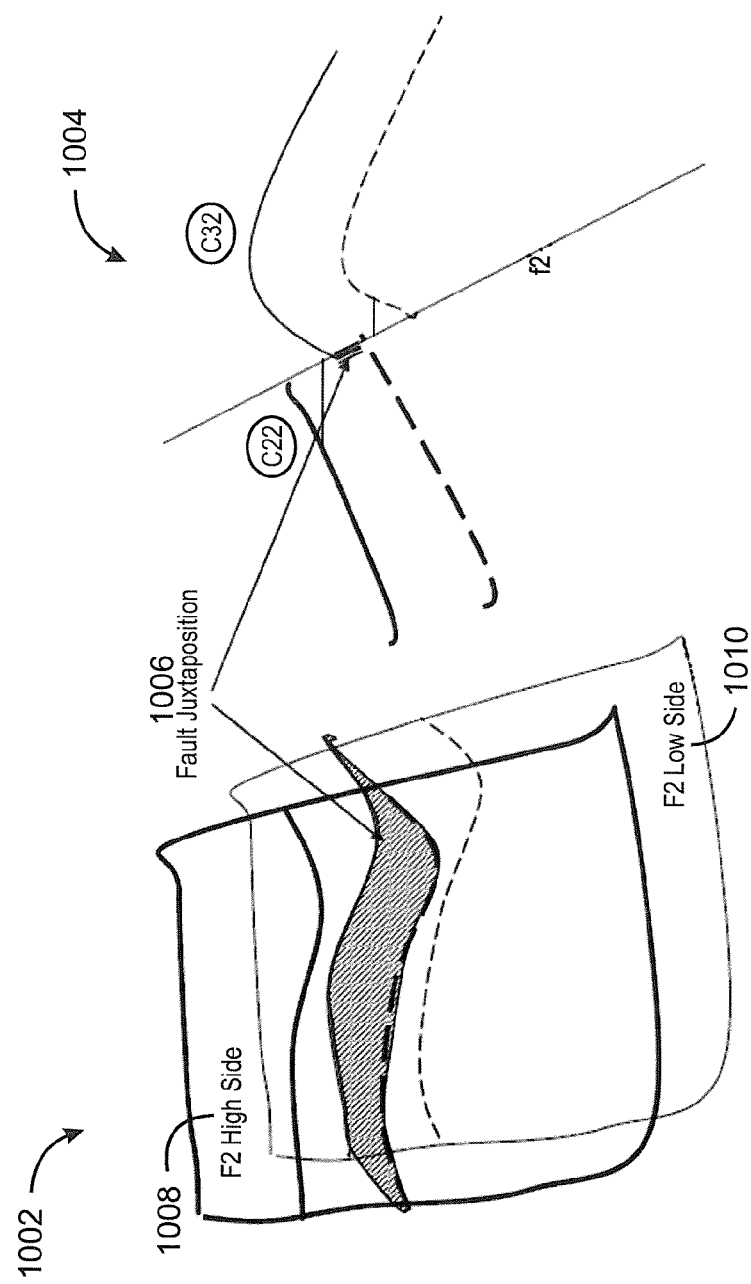
FIG. 10 is a fault plane profile.

FIG. 10 is a fault plane profile, as indicated by reference character 1000. FIG. 10 provides two views of a fault plane profile of the fault, F2, with a view 1002 from segment 3 to segment 2 shown on the left, where segment 2 is coming out of the plane and segment 3 is into the plane, and the cross sectional view 1004 shown on the right. The shaded area 1006 is where compartments C22 and C32 are in juxtaposition across the high/low sides of fault F2, and is an area where hydrocarbons are likely to leak across. To accurately evaluate this area of juxtaposition would require suitable geometric, data, such as reservoir simulation grids, the top and base seal surfaces, or rock property data within the fault zone area. If the area of juxtaposition 1006 between the high-side 1008 of fault f2 in segment 2 and the low-side 1010 of f2 in segment 3 is completely sealing it would block the connection between compartments C32 and C22 and, thus, prevent flow to compartment C11. A permeable juxtaposition in this same area would allow a connection between these compartments C32 and C22. Break over and spill point elevations may be important, but connection quality (likelihood) in these fault juxtaposition areas can also be important and may significantly impact both the fluid contact elevation and movement during the hydrocarbon production and pressure depletion phases of reservoir management.

As discussed at block 108 of FIG. 1, various constructs from the graph G(V,E) can be used to evaluate the reservoir connectivity model in the GGCM. Each construct may be represented by a sub-graph of G. For example, a spill tree diagram for selected compartments with only gas, only oil or only water connections may be created.

Figure 11A:
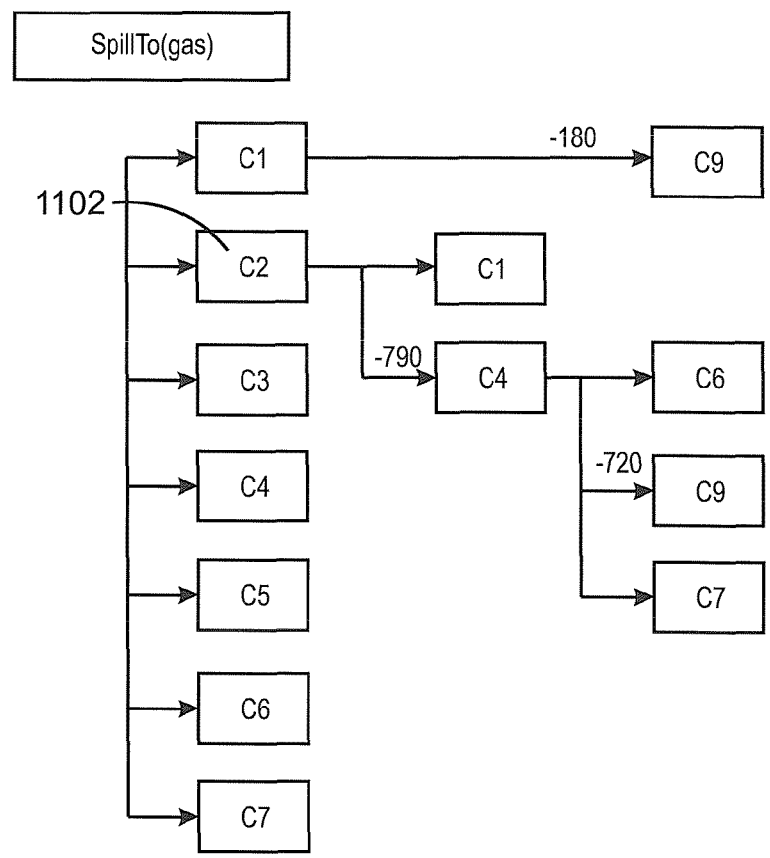
FIG. 11A is a root tree structure of a spill diagram.

FIG. 11A is a root tree structure of a spill tree diagram, as indicated by reference character 1100. Each node (vertex) represents a compartment, and can be visualized in the 3D model by means of selecting the node as if the node was an element of an object browser. To interrogate the reservoir connectivity model for a specific area of interest or a complete flow scenario from source to sink, associated geological objects, such as compartment surfaces, areas of gas columns, as well as spill pathway polygons of each node in the selected part of the tree can be interactively visualized in the 3D earth model. For example, node 1102 represents compartment C2. The child branches from the root node C2 are shown by the spill relationship from one compartment to another. In the branch node from C2, compartment C2 spills gas to C4 at depth—790 ft, and spills gas from C4 to C9 at depth—720 ft.

Figure 11B:
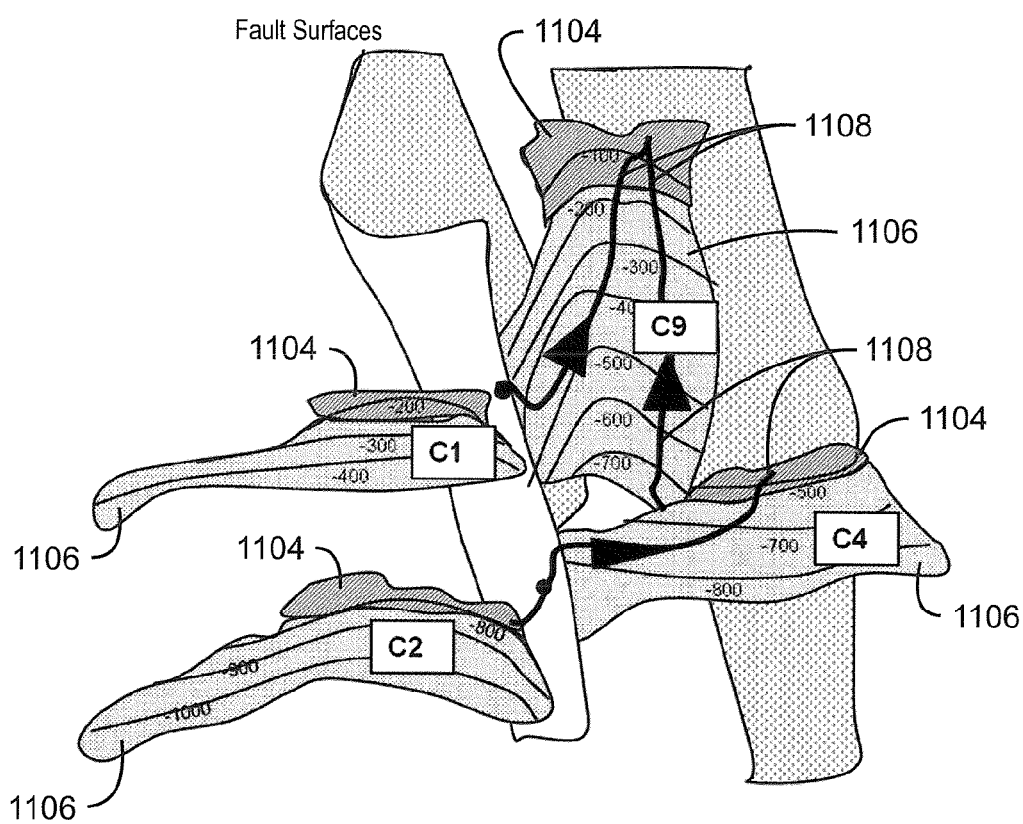
FIG. 11B is a geometrical representation of compartments with their spill relations.

FIG. 11B is a geometrical representation of compartments with their spill relations shown, as indicated by reference character 1100. The C2-C9 pathway and the C1-C9 pathway examples are shown, in which the gas columns are shown m slanted pattern at 1104 and the oil columns are shown in the dotted pattern 1106, The pathways are shown as arrowed lines 1108 indicating the anticipated fluid movement from one compartment via spill locations to other compartments.

The example shown in FIGS. 11A-11B is just one of many analyses possible using an embodiment of the methods described herein. Other interpretations and analyses of the underlying reservoir connectivity in the GGCM can also be achieved. For example, it is possible to assign uncertainties to spill paths and identify weak and/or strongly connected compartments. An aspect of the disclosed techniques could identify a critical flow path with simulated injection and production wells. Further, an aspect of the disclosed techniques could locate compartments in the model that are completely disconnected from all other compartments, locate compartments in the model that would become disconnected if either one compartment or one path were removed, or locate compartments in the model that form sub-groups such that each compartment in the sub-group is connected to the other members within the group. An aspect of the disclosed techniques may be used to create compartment clusters that are closely connected within and less connected between other compartment clusters. Finally, an aspect of the disclosed techniques may find the maximum number of pathways from the model such that removing them would not affect the connection topology of the model (or finding the ones that if removed would change the modeled topology). In each of the above possibilities, the corresponding geological objects are visualized interactively in a 3D earth environment to query the results of the graph analysis and processes to confirm, reject, and refine the model.

In any event, same process of evaluating reservoir connectivity in GGCM can be repeated until a satisfactory result is achieved. A satisfactory result may be a result that matches well with a cell-based flow simulation result, also known as history matching. As described herein at block 112, alternate scenarios and interpretations may be tested by modifying the model by splitting or merging compartments and their connection pathways based on the contact information, fluid properties and/or production data.

Aspects disclosed herein may be used to perform hydrocarbon management activities such as extracting hydrocarbons from a subsurface region or reservoir. Other hydrocarbon management activities may include hydrocarbon production, hydrocarbon exploration, identifying potential hydrocarbon resources, identifying well locations, determining well injection and/or extraction rates, acquiring, disposing of and/or abandoning hydrocarbon resources, reviewing prior hydrocarbon management decisions, and any other hydrocarbon-related acts or activities.

Figure 12:
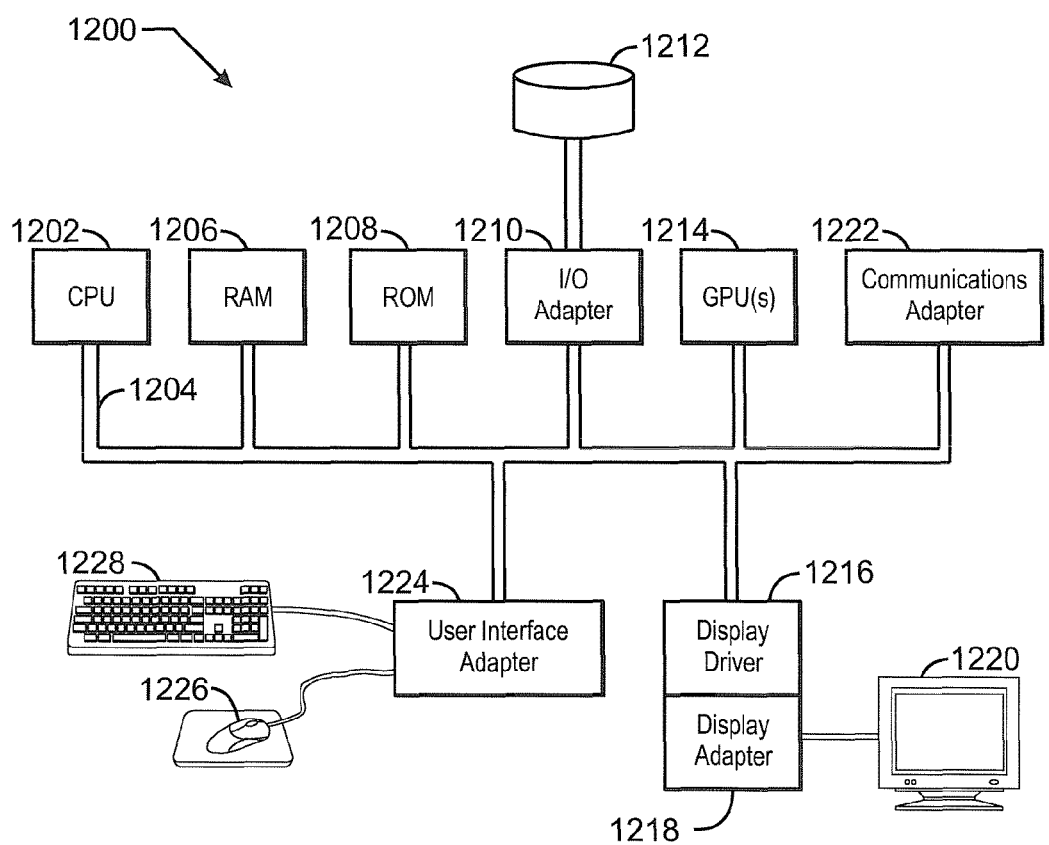
FIG. 12 is a block diagram of a computer system that may be used to generate a topological tree for a reservoir connectivity analysis according to exemplary embodiments of the present techniques.

FIG. 12 is a block diagram of a computer system that may be used to generate a topological tree for a reservoir connectivity analysis according to exemplary embodiments of the present techniques. A central processing unit (CPU) 1202 is coupled to system bus 1204. The CPU 1202 may be any general-purpose CPU, although other types of architectures of CPU 1202 (or other components of exemplary system 1200) may be used as long as CPU 1202 (and other components of system 1200) supports the operations as described herein. Those of ordinary skill in the art will appreciate that, while only a single CPU 1202 is shown in FIG. 12, additional CPUs may be present. Moreover, the computer system 1200 may comprise a networked, multi-processor computer system that may include a hybrid parallel CPU/GPU system. The CPU 1202 may execute the various logical instructions according to various exemplary embodiments. For example, the CPU 1202 may execute machine-level instructions for performing processing according to the operational flow described above in conjunction with FIG. 1 or FIG. 2.

The computer system 1200 may also include computer components such as computer-readable media. Examples of computer-readable media include a random access memory (RAM) 1206, which may be SRAM, DRAM, SDRAM, or the like. The computer system 1200 may also include additional computer-readable media such as a read-only memory (ROM) 1208, which may be PROM, EPROM, EEPROM, or the like. RAM 1206 and ROM 1208 hold user and system data and programs, as is known in the art. The computer system 1200 may also include an input/output (I/O) adapter 1210, a communications adapter 1222, a user interface adapter 1224 a display driver 1216 and a display adapter 1218. In an exemplary embodiment of the present techniques, the display adapter 1218 may be adapted to provide a 3D representation of a 3D earth model. Moreover, an exemplary embodiment of the display adapter 1218 may comprise a visualization engine or VE that is adapted to provide a visualization of extracted data. The I/O adapter 1210, the user interface adapter 1224, and/or communications adapter 1222 may, in certain embodiments, enable a user to interact with computer system 1200 in order to input information.

The I/O adapter 1210 may connect a storage device(s) 1212, such as one or more of hard drive, compact disc (CD) drive, floppy disk drive, tape drive, etc. to computer system 1200. The storage device(s) may be used when RAM 1206 is insufficient for the memory requirements associated with storing data for operations of embodiments of the present techniques. The data storage of the computer system 1200 may be used for storing information and/or other data used or generated as disclosed herein. User interface adapter 1224 couples user input devices, such as a keyboard 1228, a pointing device 1226 and/or output devices to the computer system 1200. The display adapter 1218 is driven by the CPU 1202 to control the display on a display device 1220 to, for example, display information or a representation pertaining to a portion of a subsurface region under analysis, such as displaying a visualization of data extracted by defining a region of interest in terms of 3D objects, according to certain aspects and methodologies disclosed herein.

The architecture of system 1200 may be varied as desired. For example, any suitable processor-based device may be used, including without limitation personal computers, laptop computers, computer workstations, and multi-processor servers. Moreover, disclosed aspects and methodologies may be implemented on application specific integrated circuits (ASICs) or very large scale integrated (VLSI) circuits. In fact, persons of ordinary skill in the art may use any number of suitable structures capable of executing logical operations according to the embodiments.

Input data to the computer system 1200 may include geologic and geophysical data volumes/models such as seismic volumes, geological models and reservoir models. Input data may additionally include engineering data, such as drilled well paths and/or planned well paths. Computational implementations according to exemplary embodiments of the present techniques may include connections and/or access to computational implementations of processes to model and investigate the engineering and reservoir model properties and path creation method. Relevant connections may include facilities to perform geological model analysis, reservoir simulation, engineering analysis or the like.

The present techniques may be susceptible to various modifications and alternative forms, and the exemplary embodiments discussed above have been shown only by way of example. However, the present techniques are not intended to be limited to the particular embodiments disclosed herein. Indeed, the present techniques include all alternatives, modifications, and equivalents falling within the spirit and scope of the appended claims.

What is claimed is:

1. A method for reservoir connectivity analysis in a three-dimensional (3D) earth model, the method comprising:
 identifying a subsurface region;
 obtaining a baseline reservoir connectivity model associated with the subsurface region;
 determining at least one of compartments and connections from the baseline reservoir connectivity model using reservoir connectivity analysis;
 creating a set of 3D objects, in a computer system, representing the at least one of compartments and connections from the 3D earth model, wherein the creating the set of 3D objects comprises:
  identifying one or more geometrical algorithms; and
  using the one or more geometrical algorithms to construct the set of 3D objects based on geometrical representations;
 creating a mathematical graph structure from the 3D objects, wherein the mathematical graph structure includes vertices that represent compartments or edges that represent connections, wherein the creating a mathematical graph structure comprises using graph theory algorithms and the sets of 3D objects to derive the mathematical graph structure;
 evaluating reservoir connectivity scenarios based on analysis of the mathematical graph structure and 3D objects, wherein evaluating comprises identifying flow paths and topological relations among the compartments;
 displaying on a monitor a representation of the compartments and the connection in the mathematical graph structure to visualize geometric relationships between compartments in the 3D earth model; and managing hydrocarbons based on the evaluated reservoir connectivity scenarios.

2. The method recited in claim 1, further comprising compartment-bounding surfaces, flat fluid contact planes, polygons, and points as the 3D objects.

3. The method recited in claim 1, wherein the at least one of compartments and connections are determined using dynamic reservoir connectivity analysis.

4. The method recited in claim 1, further comprising creating the 3D objects from geological objects based on the reservoir connectivity scenarios.

5. The method recited in claim 1, further comprising creating the 3D objects from petro-physical properties or production information based on the reservoir connectivity scenarios.

6. The method recited in claim 1, wherein the mathematical graph structure is created and analyzed using graph-theoretic methods.

7. The method recited in claim 1, wherein the mathematical graph structure and 3D objects are modified according to analytic results or new production data.

8. The method recited in claim 1, wherein evaluating reservoir connectivity scenarios based on analysis of the mathematical graph structure and 3D objects comprises creating one or more additional constructs based on the mathematical graph structure to evaluate the reservoir connectivity scenarios.

9. The method recited in claim 1, further comprising splitting or merging compartments and the connection pathways based on the production data in the mathematical graph structure.

10. The method recited in claim 1, further comprising assigning uncertainty the connection pathways in the mathematical graph structure.

11. The method recited in claim 1, wherein displaying on the monitor comprises displaying a geometrical representation and root tree structure of compartments and the connection pathways based on the mathematical graph structure.

12. A computer system that is adapted to obtain data corresponding to a physical property of interest from a three-dimensional earth model, the computer system comprising:
a processor; and
a tangible, machine-readable storage medium that stores machine-readable instructions for execution by the processor, the machine-readable instructions comprising:
code that, when executed by the processor, is adapted to cause the processor to identify a subsurface region;
code that, when executed by the processor, is adapted to cause the processor to obtain a baseline reservoir connectivity model associated with the subsurface region;
code that, when executed by the processor, is adapted to cause the processor to determine at least one of compartments and connections from the baseline reservoir connectivity model using reservoir connectivity analysis;
code that, when executed by the processor, is adapted to cause the processor to create a set of 3D objects representing the at least one of compartments and connections from the 3D earth model, wherein the code that is adapted to cause the processor to create the set of 3D objects comprises:
code that, when executed by the processor, is adapted to cause the processor to identify one or more geometrical algorithms; and
code that, when executed by the processor, is adapted to cause the processor to use the one or more geometrical algorithms to construct the set of 3D objects based on geometrical representations
code that, when executed by the processor, is adapted to cause the processor to create a mathematical graph structure from the 3D objects, wherein the mathematical graph structure includes vertices that represent compartments or edges that represent connections and wherein the creating a mathematical graph structure comprises using graph theory algorithms and the sets of 3D objects to derive the mathematical graph structure;
code that, when executed by the processor, is adapted to cause the processor to evaluate reservoir connectivity scenarios based on analysis of the mathematical graph structure and 3D objects, wherein evaluating comprises identifying flow paths and topological relations among the compartments;
code that, when executed by the processor, is adapted to display on a monitor a representation of the compartments and the connection in the mathematical graph structure to visualize geometric relationships between compartments in the 3D earth model; and
code that, when executed by the processor, is adapted to cause the processor to manage hydrocarbons based on the evaluated reservoir connectivity scenarios.

13. The system recited in claim 12, further comprising compartment-bounding surfaces, flat fluid contact planes, polygons, and points as the 3D objects.

14. The system recited in claim 12, wherein the at least one of compartments and connections are determined using dynamic reservoir connectivity analysis.

15. The system recited in claim 12, further comprising creating the 3D objects from geological objects based on the reservoir connectivity scenarios.

16. The system recited in claim 12, further comprising creating the 3D objects from petro physical properties or production information based on the reservoir connectivity scenarios.

17. The system recited in claim 12, wherein the mathematical graph structure is created and analyzed using graph-theoretic methods.

18. The system recited in claim 12, wherein the mathematical graph structure and 3D objects are modified according to analytic results or new production data.

19. A non-transitory, computer readable medium comprising code configured to direct a processor to:
identify a subsurface region;
obtain a baseline reservoir connectivity model associated with the subsurface region;
determine at least one of compartments and connections from the baseline reservoir connectivity model using reservoir connectivity analysis;
create a set of 3D objects representing the at least one of compartments and connections from the 3D earth model, wherein the creation of the set of 3D objects comprises identifying one or more geometrical algorithms and using the one or more geometrical algorithms to construct the set of 3D objects based on geometrical representations;

create a mathematical graph structure from the 3D objects, wherein the mathematical graph structure includes vertices that represent compartments or edges that represent connections, wherein the creation of the mathematical graph structure comprises using graph theory algorithms and the sets of 3D objects to derive the mathematical graph structure;

evaluate reservoir connectivity scenarios based on analysis of the mathematical graph structure and 3D objects, wherein the evaluation comprises identifying flow paths and topological relations among the compartments;

display on a monitor a representation of the compartments and the connection in the mathematical graph structure to visualize geometric relationships between compartments in the 3D earth model; and manage hydrocarbons based on the evaluated reservoir connectivity scenarios.

20. The non-transitory, computer readable medium recited in claim 19, further comprising compartment-bounding surfaces, flat fluid contact planes, polygons, and points as 3D objects.

21. The non-transitory, computer readable medium recited in claim 19, wherein the at least one of compartments and connections are determined using dynamic reservoir connectivity analysis.

22. The non-transitory, computer readable medium recited in claim 19, further comprising creating the 3D objects from geological objects based on reservoir connectivity scenarios.

23. The non-transitory, computer readable medium recited in claim 19, further comprising creating the 3D objects from petro physical properties or production information based on reservoir connectivity scenarios.

24. The non-transitory, computer readable medium recited in claim 19, wherein the mathematical graph structure is created and analyzed using graph-theoretic methods.

25. The non-transitory, computer readable medium recited in claim 19, wherein the graphical representation is modified according to analytic results or new production data.

* * * * *